United States Patent [19]

Honda

[11] Patent Number: 4,912,561
[45] Date of Patent: Mar. 27, 1990

[54] MANUALLY SCANNED COPYING AND PRINTING MACHINE

[75] Inventor: Iwakazu Honda, Nara, Japan

[73] Assignee: Sharp Kabushiki Kaisha, Osaka, Japan

[21] Appl. No.: 183,091

[22] Filed: Apr. 19, 1988

[30] Foreign Application Priority Data

Apr. 20, 1987 [JP] Japan .................................. 62-96885

[51] Int. Cl.⁴ .......................... H04N 1/04; G06K 9/22
[52] U.S. Cl. ..................................... 358/296; 358/473; 382/59
[58] Field of Search ....................... 346/76 PH, 140 R; 400/120, 198; 219/216; 358/285, 296, 293, 473, 494, 497, 498; 382/59

[56] References Cited

U.S. PATENT DOCUMENTS

| 4,598,302 | 7/1986 | Swidler | 346/76 PH |
| 4,626,925 | 12/1986 | Toyoda | 358/285 |
| 4,740,798 | 4/1988 | Shinoazaki | 346/76 PH |
| 4,750,049 | 6/1988 | Murakami | 358/296 |
| 4,772,954 | 9/1988 | Shin | 358/285 |

FOREIGN PATENT DOCUMENTS

| 272174 | 12/1986 | Japan | 346/76 PH |
| 041060 | 2/1987 | Japan | 346/76 PH |

*Primary Examiner*—Teresa J. Walberg
*Assistant Examiner*—Scott A. Rogers

[57] ABSTRACT

A printing machine comprises a platen roller opposed to a thermal head with transfer film therebetween, endless thermo-resist film extended around the platen roller and a transfer roller positioned in the printing block, and a heater provided in the vicinity of the printing block, for heating up the endless thermo-resist film.

9 Claims, 1 Drawing Sheet

MANUALLY SCANNED COPYING AND PRINTING MACHINE

BACKGROUND OF THE INVENTION

The present invention relates to a printing machine which prints on a paper using a thermal head and transfer film.

Conventionally, a printing machine for use as a small copying machine prints on a paper by transferring thermoplastic toner carried on transfer film onto the paper via a thermal head. To provide for printing on a desired paper such as that of a notebook, the thermal head is mounted on the machine as exposed to the exterior. The thermal head is of an end face type with circuits printed on an end face of a substrate.

The above small copying machine with the thermal head exposed to the exterior, in which circuits are printed on the narrow end face of the thermal head substrate, is difficult to manufacture and incurs high manufacturing cost since a protective member is needed to cover the exposed thermal head. In addition, the end face-type thermal head with the smaller area than a flat type thermal head tends to cause stress to concentrate on the thermal head in printing, damaging the head.

SUMMARY OF THE INVENTION

The object of the present invention is to provide a low price printing machine in which a thermal head is of a flat type and unexposed to the exterior so that it is protected against damage.

Briefly described, in accordance with the present invention, a printing machine comprises a thermal head, a platen roller mounted opposite to the thermal head with transfer film therebetween, a transfer roller disposed in the printing block, an endless thermo-resist film extended around the transfer roller and the platen roller, and a heater provided in the vicinity of the printing block, for heating up the endless thermo-resist film.

In the printing machine of the above construction, thermoplastic toner carried on the transfer film is transferred by means of the thermal head onto the endless thermo-resist film extended around the platen roller and the transfer roller. The toner, heated by the heater provided in the vicinity of the printing block, is printed by the printing block on a paper.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
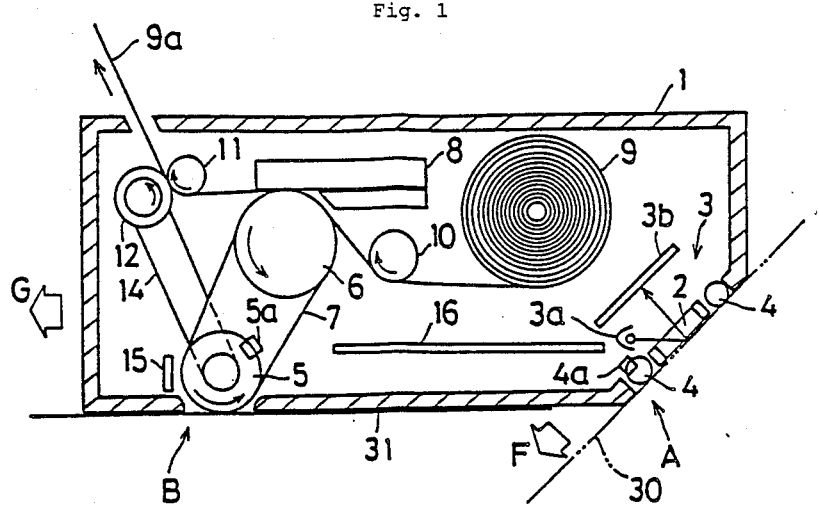
FIG. 1 is a mechanical schematic drawing of a manually-scanning copying machine to which an embodiment of the printing machine of the present invention is applied.

FIG. 1 is schematically illustrative of a manually-scanning copying machine, an application of an embodiment of the printing machine of the present invention.

The main body 1 of the printing machine is hollow and of virtually flat box shape. In its bottom, the main body 1 has a reading block "A" and a printing block "B" which are exposed to the exterior. A lens 2 is mounted in the reading block "A" of the main body 1. A reading device 3 comprising a light source 3a and a reading sensor 3b is provided on the side of the lens 2 opposite from the exterior. A pair of scanning rollers 4, 4 is provided adjacent the lateral ends of the lens 2. The scanning rollers 4, 4 rotate as the main body 1 is moved manually for scanning the image on a manuscript. The r.p.m. or the reading speed of the scanning rollers 4, 4 is detected by a reading speed sensor 4a.

The bottom panel of the main body 1 is open at the printing block "B" where a transfer roller 5 is positioned. The transfer roller 5 rotates as the main body 1 is moved manually along a sheet of paper. The r.p.m. or the printing speed of the transfer roller 5 is detected by a printing speed sensor 5a. A platen roller 6 is positioned above the transfer roller 5. Endless belt-like thermo-resist film 7 is extended around the platen roller 6 and the transfer roller 5. The thermo-resist film 7 may be made of polyimide. A thermal head 8 is mounted opposite the platen roller 6. The thermal head 8 is of a flat type.

A transfer film roll 9 is positioned to the right of the thermal head 8 and an auxiliary roller 10 is located between the transfer film roller 9 and the platen roller 6. To the left of the thermal head 8 are positioned feed rollers 11 and 12 which are in contact with each other. The feed roller 12 is connected via a chain belt 14 with the transfer roller 5 so that it is driven to rotate by the rotation of the transfer roller 5.

The transfer film roll 9 is of cassette type and therefore easy to replace. Thermoplastic toner is applied on the transfer film surface. Transfer film 9a unwound from the transfer film roll 9 is passed under the auxiliary roller 10, between the platen roller 6 and the thermal head 8 and between the feed rollers 11 and 12 and then led to the exterior of the main body 1 through a slit 13 formed in the top panel of the main body 1. As mentioned earlier, the thermo-resist film 7 is extended around the platen roller 6 and the transfer roller 5. The transfer film 9a is in contact with the thermo-resist film 7. The other side of the transfer film 9a is in contact with the thermal head 8. The transfer film 9a is pressed by the auxiliary roller 10 and the feed roller 11 against the platen roller 6.

A panel heater 15 is disposed by the side of the transfer roller 5 near the printing block "B" so that it heats up the thermo-resist film 7 extended around the transfer roller 5.

The main body 1 is equipped with a reading switch not shown, a printing switch, also not shown. Reference number 16 is a circuit board containing a controller for controlling each component of the printing machine.

Figure 2:
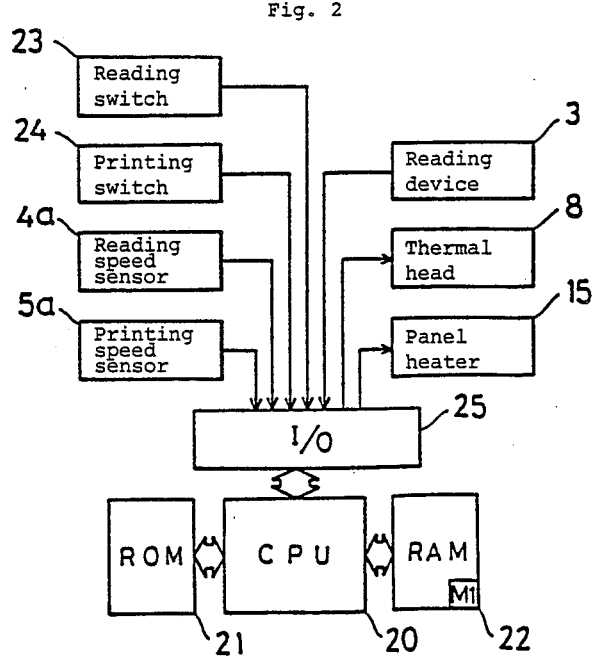
FIG. 2 is an electrical block diagram of the controller of the copying machine of FIG. 1.

FIG. 2 is a block diagram showing the construction of the controller of the copying machine.

The entire operation of the machine is controlled by a CPU 20. A processing program is stored in advance in a ROM 21. A RAM 22 serves as a working area in executing the processing program. The CPU 20 is connected via an I/O 25 to the reading switch 23, printing switch 24 and each of the I/O devices described above.

The RAM 22 has a memory area M1 for storing image data read by the reading device 3. When image data is stored in the area M1, a storing pitch is set based on the reading speed detected by the reading speed sensor 4a. The image data stored in the area M1 is output to the thermal head 8. The pitch at which the image data is output to the thermal head 8 is set on the basis of the printing speed detected by the printing speed sensor 5a so that an image is printed wihtout distortion even if the printing speed i.e. the manually-scanning speed fluctuates.

The operation of the present invention will now be described, starting from the reading operation.

When reading switch provided on the main body 1 is operated, the reading device 3 starts reading a manuscript 30. When the main body 1 is moved in the direction indicated by the arrow F as pressed against the manuscript 30 for scanning, the scanning rollers 4, 4 rotate. The r.p.m. (reading speed) of the scanning rollers 4, 4 is detected by the reading speed sensor 4a. Image data read by the reading device 3 is stored in the area M1 at a pitch based on the reading speed. When image reading is completed, the reading switch on the main body 1 is operated. Then, the reading device 3 will not read the image any more if the main body 1 is moved along the manuscript for scanning.

With respect to the printing operation, when the printing switch on the main body 1 is operated, the panel heater 15 is turned ON and heats up the thermo-resist film 7 on the transfer roller 5. When the main body 1 is moved in the direction indicated by the arrow G as pressed against a desired paper such as that of a notebook, the transfer roller 5 rotates, causing the thermo-resist film 7 and the platen roller 6 to rotate in the direction indicated by the arrow, the printing speed of the transfer roller 5 being detected by the printing speed sensor 5a. The image data stored in the area M1 is output to the thermal head 8 at a pitch based on the printing speed whereby the thermo-plastic toner on the transfer film 9a is transferred onto the thermo-resist film 7.

The feed roller 12 connected via the chain belt 14 with the transfer roller 5, rotates in the direction indicated by the arrow as the transfer roller 5 rotates. With this rotation, the transfer film 9a is uncoiled and led along its passage while thermoplastic toner carried on the transfer film surface is transferred sequentially on the thermo-resist film 7. The thermoplastic toner transferred onto the thermo-resist film 7 is softened as it is heated up by the panel heater 15 and transferred by means of the transfer roller 5 onto the paper 31. Sine the transfer roller 5 is pressed against the paper 31, the softened toner is securely transferred onto the paper 31.

When printing is completed, the printing switch on the main body 1 is operated. Then, the panel heater 15 is turned OFF and image data is no longer output to the thermal head 8.

Thus, the printing machine of the present invention prints an image on a desired sheet of paper, using a relatively cheap flat type thermal head 8. In the above embodiment of the invention, the panel heater 15 is installed in the vicinity of the transfer roller 5 for heating the thermo-resist film 7. Alternatively, a heating source may be provided in the transfer roller 5 to maintain the transfer roller surface at a temperature permitting the toner to be softened.

According to the present invention, as understood from the above, the head portion of the thermal head need not be exposed to the exterior of the printing machine main body. Therefore, a flat type thermal head may be used, and no head protective member is required. Accordingly, the thermal head can be manufactured at a low cost. Moreover, since the thermal head of flat shape is not exposed to the exterior, the head is hardly damaged.

While certain embodiments of the present invention have been described, it will be apparent to those skilled in the art that various changes and modifications may be made therein without departing from the spirit and scope of the present invention as hereinafter.

What is claimed is:

1. A manually scanned printing machine comprising:
   a housing including a reading block surface and a printing block surface, said reading block surface being located adjacent said printing block surface and further including therein respective first and second openings;
   image pick up means located in said first opening and including a reading lens thereat;
   an image transfer roller located in said second opening;
   image storing means in said housing for storing an image scanned by said image pick up means during a reading operation;
   thermal head means in said housing for receiving an image from said storing means during a printing operation;
   a platen roller opposite said thermal head means and including a section of transfer film therebetween;
   an endless length of thermal-resist film in contact with said transfer film for receiving toner and extending around said platen roller and said image transfer roller for heating up said endless thermal-resist film whereby said image is transferred to a printing medium adjacent said printing block surface due to contact with said image transfer roller; and
   a set of feed rollers driven by said image transfer roller and an auxiliary roller, located on opposite sides of said platen roller, for translating said transfer film and pressing said transfer film into contact with said platen roller and said thermal-resist film.

2. The printing machine of claim 1, wherein said thermal head means comprises a flat type thermal head.

3. The printing machine of claim 1, wherein said endless length of thermal-resist film is comprised of polyimide.

4. The printing machine of claim 1 and wherein said transfer film comprises a roll of film located in said housing.

5. The printing machine of claim 1 wherein said housing includes a wall opposite said printing blcok and having a third opening therein for the passage of transfer film therefrom following contact with said platen roller and said thermal-resist film.

6. The printing machine of claim 1 and further including means for sensing scanning speed during a reading operation for setting a pitch in said image storing means based on scanning speed of the image being read.

7. The printing machine of claim 6 wherein said means for sensing scanning speed includes a set of scanning rollers located in said first opening and a speed sensor coupled to at least one of said rollers for measuring the rotational speed thereof.

8. The printing machine of claim 6 and further including means for sensing printing speed during a printing operation for setting a pitch in said thermal head means based on printing speed being sensed.

9. The printing machine of claim 8, said means for sensing printing speed includes a speed sensor coupled to said transfer roller for measuring the rotational speed thereof.

* * * * *